May 24, 1966  P. E. OLSON  3,252,471

MULTI-PURPOSE VALVE DEVICE

Filed April 17, 1963  3 Sheets-Sheet 1

INVENTOR.
Paul E. Olson
BY
*A. A. Steinmiller*
Attorney

May 24, 1966 P. E. OLSON 3,252,471
MULTI-PURPOSE VALVE DEVICE

Filed April 17, 1963 3 Sheets-Sheet 2

INVENTOR.
Paul E. Olson
BY
*A. G. Steinmiller*
Attorney

May 24, 1966 P. E. OLSON 3,252,471
MULTI-PURPOSE VALVE DEVICE
Filed April 17, 1963 3 Sheets-Sheet 3

INVENTOR.
Paul E. Olson
BY *A. A. Steinmiller*
Attorney

United States Patent Office 3,252,471
Patented May 24, 1966

3,252,471
MULTI-PURPOSE VALVE DEVICE
Paul E. Olson, Pittsburgh, Pa., assignor to Westinghouse Air Brake Company, Wilmerding, Pa., a corporation of Pennsylvania
Filed Apr. 17, 1963, Ser. No. 273,705
6 Claims. (Cl. 137—85)

This invention relates to multi-purpose valve devices and, more particularly, to such a device having means whereby it may be conditioned to perform one of a multiplicity of control functions in a fluid pressure control system which would normally require a variety of control valve devices each limited to perform a specific control function.

In order to perform an overall function, a fluid pressure system may require a number of different types of control valve devices each of which is designed to perform a specific control function in cooperation with the other control devices. Such a fluid pressure system may require one or more of devices such as a direct relay valve device, a differential relay valve device, an inverse relay valve device, an open-or-closed valve device, or a vacuum and fluid pressure interlock valve device. It may be necessary, therefore, to maintain a large inventory of the various valve devices listed above in order to assemble any desired fluid pressure system and maintain such system by replacing worn-out or broken valve devices during its working life.

The object of the present invention, therefore, is to provide a novel multi-purpose valve device and method for manually converting the valve device to the form necessary for performing the particular control function desired. The multi-purpose valve device embodying the invention comprises a main or central body portion housing a double-diaphragm piston assemblage which may comprise a pair of diaphragms of different effective pressure areas. The respective effective pressure areas of the two diaphragms comprising the piston assemblage may be altered independently of each other without changing the diaphragms themselves. This is accomplished by providing various sets of interchangeable retaining rings adapted to be disposed adjacent the outer periphery of the diaphragms and various sets of interchangeable follower discs adapted to be disposed adjacent the inner portion of the diaphragm, said sets of retaining rings and follower discs being of various inner and outer diameters, respectively, to provide an exposed area of the diaphragm at a radial distance from the axis of the piston assemblage according to the diametral dimensions of the sets of rings and discs selected. Thus the respective effective pressure areas of the two diaphragms may be so varied that the valve device may be used as a differential pressure relay valve device for either amplifying or diminishing the pressure of fluid delivered relative to that of the control fluid. The double-diaphragm piston controls operation of a supply-exhaust valve arrangement partly housed in the main body portion and partly in a rotatable portion coaxially and rotatably supported relative to and on the main body portion of the valve device. The rotatable portion is manually rotatable to several distinct positions whereby various passageways formed in the rotatable portion and connectable to fluid pressure supply, delivery or exhaust ports may be either connected with or disconnected from a passageway formed in the central portion of the valve device. Operation of the valve device is controlled by the degree of pressure of control fluid supplied independently to several control chambers one of which is disposed between the two diaphragms of the double diaphragm piston, and the other two of which are disposed at opposite ends of the double diaphragm piston. Thus, to obtain the desired function from the multi-purpose valve device embodying the invention, it is merely necessary to set the rotatable portion of the device to the appropriate position, connect the several ports to several pipes via which pressurized fluid is supplied, delivered or exhausted, and provide the proper control pressure in the various control chambers adjacent the double-diaphragm piston.

A multi-purpose valve device embodying the invention is shown in the drawings of which:

Description

Figure 1:
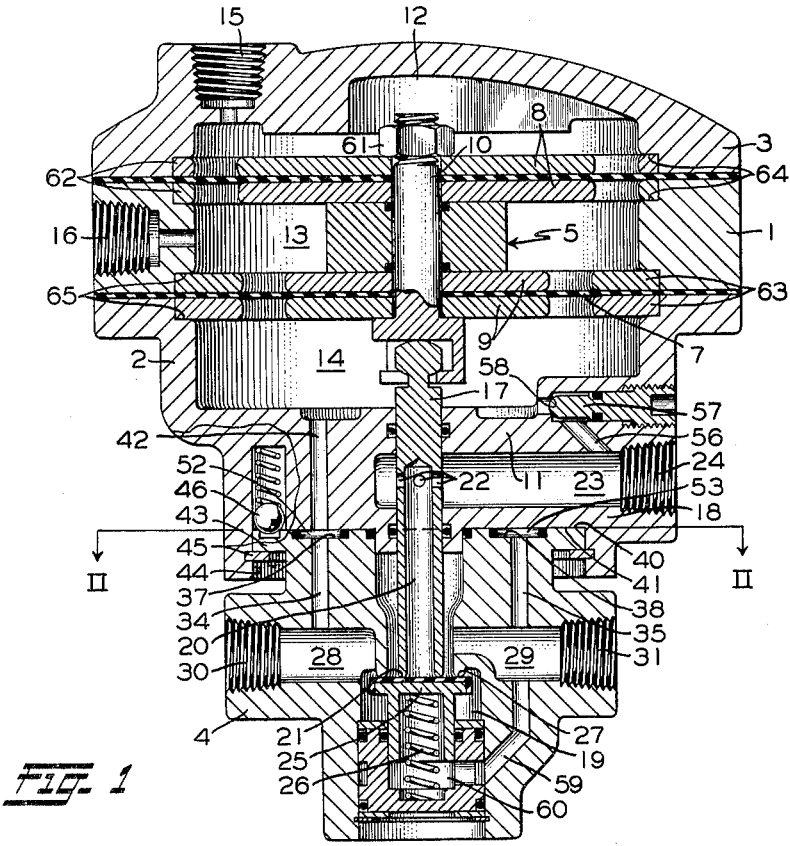
FIG. 1 is an elevational view, in section, of the multi-purpose valve device.

As shown in FIG. 1 of the drawings, one form of a multi-purpose valve device embodying the invention may comprise a casing made up of an intermediate section 1 disposed between and in axial alignment with a central or main casing section 2 and a cap section 3. A rotatable casing section 4 is carried at the end of main section 2 opposite intermediate casing section 1 in axial alignment therewith and manually rotatable selectively to any one of several positions relative to said main casing section, in which it may be releasably fixed.

The cap section 3, intermediate casing section 1 and main casing section 2 cooperate to house a double-diaphragm piston assemblage 5 comprising two diaphragms 6 and 7 which may be of similar or different effective pressure areas, for a purpose to be hereinafter disclosed. The diaphragms 6 and 7 are centrally fastened by two respective sets of piston followers 8 and 9 to a piston stem 10 with an axial collar-type spacer therebetween, said diaphragms being clamped adjacent their respective outer peripheries between cap section 3 and intermediate casing section 1, and between said intermediate casing section and main casing section 2. The several casing sections 1, 2 and 3, along with the diaphragms 6 and 7 and a transverse separating wall 11 formed in main casing section 2, cooperate to form an upper control chamber 12, an intermediate control chamber 13, and a lower control chamber 14, said control chambers being disposed on the side of diaphragm 6 adjacent cap section 3, between the two diaphragms 6 and 7, and at the side of diaphragm 7 adjacent separating wall 11, respectively. The upper control chamber 12 and the intermediate chamber 13 open respectively to pipe connections or ports 15 and 16 formed in the respective casing sections 3 and 1.

The multi-purpose valve device is further provided with a supply-exhaust valve arrangement comprising a stem-like valve member 17 having one end removably secured to the end of piston stem 10 adjacent lower control chamber 14 and extending axially therefrom through separating wall 11 and an end wall 18 of casing section 2, in sealing and sliding relation therewith, into and terminating in a valve chamber 19 formed in rotatable casing section 4. The valve member 17 is provided wtih a coaxial connecting passageway 20 opening at the end of said valve member adjacent valve chamber 19 to form an annular valve seat rib 21 at said end, said passageway extending through said valve member and terminating with a plurality of openings 22 leading into a chamber 23 disposed in casing section 2 between the walls 11 and 18. Chamber 23 is provided with a pipe connection or port 24.

The annular valve seat rib 21 is seatable on a disc-like valve member 25 slidably supported in a lower recess formed in rotatable casing section 4 in axial alignment with valve member 21, said valve member being biased by a spring 26 toward a seated position relative to said annular seat rib and a fixed annular valve seat rib 27 formed in said casing section and concentrically surrounding the valve seat rib 21. The valve seat rib 27 cooperates with valve member 25, in a manner to be more fully disclosed hereinafter, for controlling communication between two conveniently disposed chambers 28 and 29 formed in rotatable casing section 4, each of said chambers having pipe connections or ports 30 and 31 respectively opening thereinto, as more clearly seen in FIG. 2 of the drawings. Rotatable casing section 4 is provided with a third chamber 32 conveniently formed therein and also having a pipe connection or port 33 opening into said chamber.

Each of the chambers 28, 29 and 32 has one end of respective passageways 34, 35 and 36 opening thereto, the other ends of said passageways opening at 37, 38 and 39, respectively, to a face 40 of the casing section 4 abutting against a matching face 41 of casing section 2. The openings 37, 38 and 39 are equi-radially spaced from the aligned axes of the casing sections 2 and 4 to permit registry of one of the respective passageways 34, 35 and 36, in a selected angular position of the rotatable casing section 4 (as will later become clear), with a connecting passageway 42 having one end opening to face 41 and the other end opening into chamber 14. For purposes of convenience, though not necessary to be so arranged, the openings 37, 38 and 39 are spaced at 90° intervals, as shown in FIG. 2.

As was noted above, the casing section 4 is rotatable about its axis relative to main casing section 2 to any one of several positions which will be hereinafter defined. The upper end of rotatable casing section 4, as viewed in the drawing, is provided with an annular portion 43 which fits into an annular recess or bore 44 formed on the lower end of main casing section 2 with sufficient freedom to permit relative rotation therebetween and with the matching faces 40 and 41 abutting one another. The rotatable casing section 4 may be retained in its assembled relationship with main casing section 2 by use of resilient lock ring 45 which snaps into a cooperating annular groove on the inner surface of recess 44.

Figure 2:
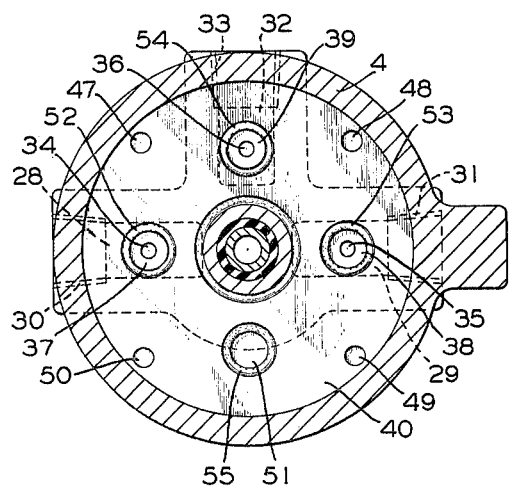
FIG. 2 is a sectional view, taken along line II—II of FIG. 1, as viewed in the direction indicated by the arrows.

A spring-biased ball detent 46 is recessed in main casing section 2 and protrudes from face 41 to engage one of four equi-angularly spaced recesses 47, 48, 49 and 50 formed in the face 40 of rotatable casing section 4, as seen in FIG. 2, said ball detent being radially disposed so as to register with and engage in said four recesses selectively. Since the ball detent 46 is angularly spaced at 45° from connecting passageway 42, the rotatable section 4 is selectively positionable in one of four positions in which said connecting passageway may register with one of the openings 37, 38 or 39 and, therefore, communicate with one of the passageways 34, 35 or 36, respectively, or in which said connecting passageway registers with a blanked recess 51 formed in face 40 of casing section 4, said blanked recess being disposed correspondingly to openings 37, 38 and 39. Each of the openings 37, 38 and 39 and the recess 51 is provided with respective sealing rings 52, 53, 54 and 55 to make an air-tight seal with passageway 42 in casing section 2 when registering therewith and thereby prevent fluid pressure leakage between the two casing sections 2 and 4.

A passageway 56 formed in main casing section 2 has one end open to chamber 14 and the other end open to chamber 23. Communication through passageway 56, and therefore between chambers 14 and 23, may be opened or cut off by a screw-threaded valve 57, which, if screwed outwardly of casing section 2 to an open or unseated position of a valve seat 58 opens said communication, and, if screwed inwardly to a closed or seated position on said valve seat, closes said communication.

A passageway 59 is formed in rotatable casing section 4 and has one end opening to chamber 29 while the other end opens to a chamber 60 formed in said rotatable casing section adjacent the lower side, as viewed in the drawing, of the valve member 25, the spring 26 being disposed in said chamber 60. The purpose of passageway 59 is to provide for equalization of fluid pressures acting on both sides of the valve member 25 in a manner to be more fully explained hereinafter.

*Operation*

In considering the operation of the multi-purpose valve device embodying the invention and the various modifications and uses to which it is adaptable, first consideration will be given to the form shown in FIG. 1 of the drawings when used simply as an open or closed or "on-off" valve device normally occupying a closed or "off" position. In this situation, unless already in the position shown in the drawing, the rotatable section 4 is manually rotated to what may be called a first position until opening 37 and therefore passageway 34 registers with passageway 42 in main casing section 2 while valve 57 is screwed inwardly to its closed position.

A source of fluid under pressure (not shown) is connected by suitable conduit means (not shown) to the connection 30 and therefore chamber 28, while chamber 29, acting in this instance as a delivery chamber via connection 31, is connected to a device (not shown) to be supplied with pressurized fluid. Connection 24, in this instance, serves as an exhaust port.

Thus, with fluid under pressure supplied to chamber 28, said fluid under pressure may flow, via passageways 34 and 42, into lower control chamber 14 to act on the adjacent side of diaphragm 7 and thereby cause the diaphragm piston assemblage 5 to be moved upwardly, as viewed in the drawings, toward a cut-off position carrying with it the valve member 17 to unseat valve seat rib 21 from the valve member 25. With valve member 17 unseated from valve member 25, chamber 29, and therefore the device (not shown) connected thereto via constriction 31, is vented to atmosphere via connecting passageway 20, openings 22, chamber 23 and port 24.

It should also be noted that, with chamber 29 open to atmosphere, as immediately above described, the under side of valve member 25, as well as the upper side, is subjected, via passageway 59, to atmospheric pressure. The diametric dimensions of the valve seat rib 27 and the valve member 25 are such that, with valve member 17 unseated, the upper surface portion of said valve member 25 exposed to atmospheric pressure, or the area enclosed within the seat rib 27, is substantially equivalent to the area on the under side of said valve member subject to atmospheric pressure, while the balance of said areas are equally subjected to the pressure of fluid in chamber 28. The effects of fluid and atmospheric pressures acting on the valve member 25, therefore, are balanced, so that the spring 26 is effective for keeping said valve member seated on seat rib 27 and thereby keep pressurized fluid supply in chamber 28 cut off from delivery chamber 29 and the device connected thereto.

When pilot fluid at a pressure sufficient for over-coming the combined opposing forces of fluid pressure in lower control chamber 14 acting on diaphragm 7 and of the spring 26 acting against the lower side of valve member 25, is supplied (in a manner not deemed essential to an understanding of the invention) to upper control chamber 12 via connection 15, such pilot fluid pressure is effective for moving the diaphragm piston assemblage 5 downwardly, as viewed in the drawing, toward a supply position in which the seat rib 21 of the valve member 17 is first seated on the valve member 25 to cut off the exhaust communication between chamber 29 and port 24. Further downward movement of the valve assemblage 5 toward its supply position causes the valve member 17, now seated on the valve member 25, to unseat said valve member from the seat rib 27 and thereby establish supply communication between supply chamber 28 and delivery chamber 29 past said unseated valve seat member. As long as pilot pressure is maintained in upper control chamber 12, fluid under pressure is supplied to the fluid pressure operable device connected to connection 31.

Of course, release of pilot pressure from upper control chamber 12 will result in restoration of valve member 25 to its seated position on seat rib 27 to cut off further supply of pressurized fluid to the device connected to port 31, and then unseating of seat rib 21 from said valve seat member to permit exhaustion of fluid pressure from the device connected to port 31, as above described.

As shown in FIG. 1 of the drawings, diaphragm 6 is shown as having a greater effective pressure area subject to pilot fluid pressure in upper control chamber 12 than the effective pressure area of diaphragm 7 subject to supply fluid pressure in lower control chamber 14. Excluding the effect of spring 26, the degree of pilot pressure in control chamber 12, therefore, required for effecting operation of the piston assemblage 5 to its supply position, as related to the degree of supply pressure in chamber 14, must be some value greater than the ratio of the effective area of diaphragm 7 to the effective area of diaphragm 6, it being additionally necessary for the degree of said pilot pressure to be increased sufficiently to overcome the additional resistance of said spring. It becomes evident, therefore, that depending on the respective degrees of the pilot and supply fluid pressures, the respective effective pressure areas of the diaphragms 6 and 7 must be provided accordingly. The multi-purpose valve device disclosed herein is so constructed as to provide the versatility necessary to adapt it to a wide range of varying fluid pressures.

According to another feature of the invention, the effective pressure areas of the respective diaphragms 6 and 7 can be altered to obtain the desired results with the available pressures by simply removing a nut 61 at the upper end of piston stem 10 and replacing the respective matching sets or pairs of diaphragm followers 8 and 9 with other matching pairs of selected outer diametral dimensions, while also interchanging respective matching sets or pairs of outer peripheral retainer rings 62 and 63 with others of selected inner diametral dimensions. The retainer rings 62 and 63 are interchanged by separating casing sections 2 and 3 from casing section 1, said pairs of retainer rings being adapted to fit in oppositely registering shoulders 64 formed on casing sections 1 and 3 and oppositely registering shoulders 65 formed on casing sections 1 and 2, thereby exposing an area of the diaphragms 6 and 7 between said retainer rings and the followers 8 and 9 at a radial distance from the axis of the piston assemblage 5 in accordance with the diameters of the retainer rings and followers selected to thereby provide the desired effective pressure areas on the respective diaphragms.

If it is desired to employ the multi-purpose valve device as an "on-off" device normally occupying an open or "on" position, the valve device is conditioned for such operation by rotating the rotatable section 4 through 90°, in a clockwise direction as viewed in FIG. 2, to a second position until blanked recess 51 blocks off passageway 42 and, therefore, isolates lower control chamber 14 from said rotatable casing section. Valve 57 is screwed outwardly to its unseated position to open communication between lower control chamber 14 and chamber 23 through passageway 56. The source of fluid under pressure (not shown) or supply of pressurized fluid is disconnected from port 31 and connected to port 24, whereby chamber 23 now acts as the supply chamber, and chamber 28 acts as the exhaust chamber, while chamber 29 remains as the delivery chamber.

When pressurized fluid is supplied to chamber 23, said fluid flows via passageway 56, past unseated valve 57, to lower control chamber 14 wherein it acts on the adjacent side of diaphragm 7 causing upward movement of the piston assemblage 5. Upward movement of piston assemblage 5 effects unseating of seat rib 21 from valve seat member 25, whereupon pressurized fluid from chamber 23 flows through openings 22, connecting passageway 20, past seat rib 21 and through chamber 29 to the fluid pressure operable device (not shown) connected thereto. Thus as long as no other influencing fluid pressures are supplied to the other control chambers 12 and 13, fluid pressure in chamber 14 acting on diaphragm 7 will maintain seat rib 21 in its unseated position, or it can be said that the valve device occupies a normal "on" position.

Of course, supply of pilot fluid to upper control chamber 12 at an adequate pressure will effect downward movement of the piston assemblage 5 to first cause seat rib 21 to be seated on valve member 25 and then cause said valve member to be unseated from seat rib 27, as above described, which, in this case, results first in cut-off of further supply to port 31 and the device connected thereto and then exhaust of said device past said unseated valve member and out through chamber 28 which is now serving as the exhaust chamber.

A controlled fluid pressure may be provided in intermediate control chamber 13 via port 16 to thereby provide an opposing biasing effect to pilot pressure in chamber 12 thus necessitating a predetermined pilot pressure for effecting operation of the valve device out of either its normally open or normally closed position, depending on how it is set up to function.

The multi-purpose valve device embodying the invention may also be employed as a differential relay valve device by screwing valve 57 to its seated position on seat 58 and rotating the rotatable casing section 4, from the position in which it is shown in FIGS. 1 and 2 of the drawings, through 180° to a third position until passageway 35 and therefore chamber 29 registers with passageway 42 and chamber 14 in the main casing section 2. With casing section 4 rotated through 180°, the respective positions of chambers 28 and 29 would be reversed in the drawing with respect to each other, that is, chamber 28, or the supply chamber to which the supply source (not shown) of pressurized fluid is connected, would appear on the right-hand side, while chamber 29, or the delivery chamber to which the fluid pressure operable device (not shown) is connected would appear on the left-hand side of the drawing. Chamber 23 and port 24 serve as the exhaust route.

With the valve device conditioned as immediately above described, pilot pressure delivered to the upper control chamber 12 effects downward movement of the piston assemblage 5 and, therefore, unseating of valve member 25 from seat rib 27 by the piston stem 17. With valve member 25 in its unseated position from seat rib 27, pressurized fluid flows from supply chamber 28, past said unseated valve member to delivery chamber 29 and thence to the device connected to port 31. At the same time, it being recalled that rotatable section 4 has been rotated 180° from the position shown in FIG. 2, pressurized fluid from supply chamber 28 passing through delivery chamber 29 also flows through passageways 35, registering with passageway 42, into lower control chamber 14. Thus, fluid pressure builds up in chamber 14 until the forces produced thereby on the adjacent side of diaphragm 7, along with the co-acting force of spring 26, balance the opposing forces produced by pilot pressure in chamber 12 acting on the adjacent side of diaphragm 6, whereupon the piston assemblage 5 moves upwardly until valve member 25 reseats on seat rib 27 to occupy a lapped position in which further flow of pressurized fluid to delivery chamber 29 and lower control chamber 14 is cut off. When pressure in chamber 14 drops below the value at which the pressure in chamber 12 is balanced, piston assemblage 5 moves downwardly again to unseat valve member 25. It should be apparent, therefore, that the ratio of delivered pressure (that is, the pressure delivered to chamber 29) to pilot pressure (control pressure introduced in chamber 12) is equivalent to the ratio of the effective pressure area of diaphragm 6 to the effective pressure area of diaphragm 7.

It should be apparent, therefore, that by interchanging the follower sets 8 and 9 and the retainer ring sets 62 and 63 with others of predetermined dimensions, in the manner above described in connection with the "on-off" arrangement, the effective pressure areas of the diaphragms 6 and 7 can be correspondingly altered to effect the desired relationship between pilot pressure and delivered pressure, that is, to effect a delivered pressure either greater than, equal to, or lesser than the pilot pressure.

Again, in the event it is desired to prevent operation of the valve device, when used as a differential relay valve device, until a predetermined pilot pressure has been established in the upper control chamber 12, a fixed pressure may be provided in intermediate control chamber 13 for biasing the piston assemblage 5 and the piston stem 17 upwardly in this instance (since the effective pressure area of diaphragm 6 is greater than that of diaphragm 7, as shown in FIG. 1). With piston stem 17 biased upwardly, the valve member 25 seats on seat rib 27 to cut off supply of pressurized fluid to delivery chamber 29 until a predetermined pilot pressure is established in chamber 12 to overcome the fixed pressure in chamber 13.

If it is desired to maintain constant pressurized fluid delivery to delivery chamber 29 and to the device connected thereto, the diaphragms merely need be arranged to have the one with the greater effective pressure area adjacent chamber 14 and the other with the lesser area adjacent chamber 12, whereby, with a fixed pressure in chamber 13 it is evident that the valve member 25 will be maintained in an unseated position from seat rib 27 without presence of pilot pressure in chamber 12.

The multi-purpose valve device embodying the invention may also be conditioned to function with a vacuum and pressure interlock feature. For example, let it be assumed that the diaphragms 6 and 7 are arranged so that the uper diaphragm 6 has a lesser effective pressure area than the lower diaphragm 7. Let it further be assumed that the valve device is conditioned to function as a differential relay valve device, that is, the rotatable casing section 4 is rotated through 180° relative to the position in which it is shown in FIG. 2 so that passageway 35 registers with passageway 42, pressurized fluid supply is connected to port 30, and the delivery port 31 is connected to the fluid pressure operable device (not shown) with port 24 acting as the exhaust port.

By providing a vacuum in the intermediate control chamber 13, the piston assemblage 5 is biased upwardly to its cut-off position to keep piston stem 17 and, therefore, seat rib 21 unseated from valve member 25. Thus valve member 25 is biased by spring 26 to its seated position on seat rib 27 to cut off supply of pressurized fluid from supply chamber 28 to delivery chamber 29, the latter chamber, and therefore the device (not shown) connected thereto, being vented to atmosphere via chamber 29, passageway 20 in piston stem 17, chamber 23 and port 24. When pilot fluid pressure is supplied to upper control chamber 12 to overcome the vacuum in chamber 13 and biasing force of spring 26, seat rib 21 is first seated on valve member 25 which, in turn, is unseated from seat rib 27 to first close delivery chamber 29 to atmosphere and then connect it to supply chamber 28 until supply pressure in chamber 14 (via registering passageways 35 and 42), acting with the vacuum forces in chamber 13, overcomes the pilot pressure in chamber 12 to move the piston assemblage 5 upwardly until the opposing fluid pressures and forces are balanced. Thus, the degree of pilot pressure and the differential established between the two diaphragms 6 and 7 by the vacuum in chamber 13 determine the degree of fluid pressure established in delivery chamber 29 and delivered to the device connected thereto.

The multi-purpose valve device may be set in still a further manner to function as an "on-off" valve device. The rotatable section 4 may be rotated, either in a clockwise direction through 270° or in counterclockwise direction through 90° from the position in which it is shown in FIG. 2 of the drawings, to a fourth position in which passageway 35 (shown in FIG. 2) registers with passageway 42 to place chamber 14 in communication with chamber 32. Chamber 32, which is formed in rotatable casing 4 and is isolated from chambers 28 and 29, is connected via port 33 to the source (not shown) of pilot fluid pressure which may be selectively supplied or cut off by a control at some remote point for effecting operation of the valve device.

With the valve device conditioned as immediately above noted, a fixed pressure may be provided in upper control chamber 12 to cause the piston assemblage 5 to be normally maintained in its supply position, above described, in which pressurized fluid is supplied from supply chamber 28 to delivery chamber 29. To cut off supply of pressurized fluid to delivery chamber 29 and to the device connected thereto, pilot pressure is effected by the remote control to chamber 32 and therefore to chamber 14, via passageways 36 and 42, whereupon the piston assemblage 5, in the manner above described, is restored to its cut-off position.

Figure 3:
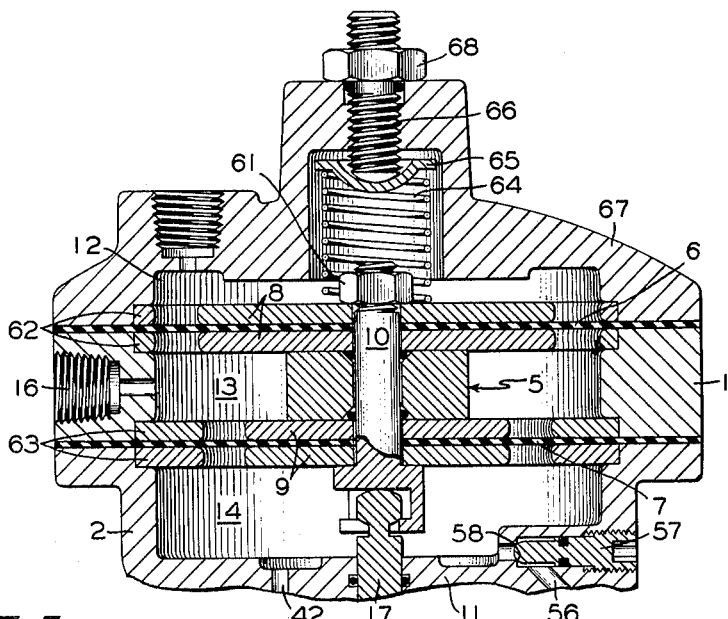
FIG. 3 is a fragmentary view, in section, of a portion of the multi-purpose valve device shown in FIG. 1 with certain modifications.

A modification of the multi-purpose valve device embodying the invention is shown in FIG. 3 of the drawings, which shows only the upper portion of the valve device wherein the modification occurs. The modification consists of a spring 64 disposed in upper control chamber 12 with one end bearing against the piston follower 8 and the other end bearing on a spring seat 65. One end of an adjusting screw 66, which is disposed in a modified cap section 67 and in axial alignment with spring 64, abuts against the spring seat 65 for adjusting the downwardly direction biasing effect exerted by said spring on the piston assemblage 5. The biasing effect of spring 64 may be adjusted by screwing the screw 66 into or out of cap section 67 which is intended to replace cap section 3 as shown in FIG. 1. A locking nut 68 is provided to lock the screw 66 in an adjusted position.

By providing the spring 64 in upper control chamber 12, the spring may be utilized to either act instead of a fixed fluid pilot pressure in said chamber or to supplement any fluid pilot pressure provided in said chamber.

Figure 4:
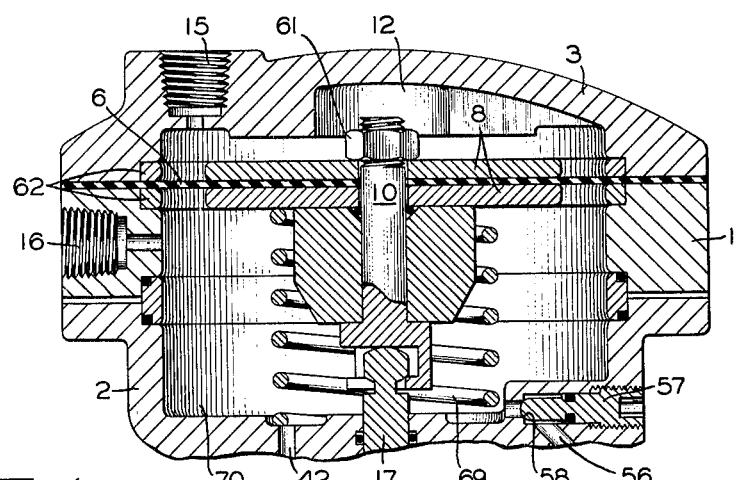
FIG. 4 is a fragmentary view, in section, of a portion of the multi-purpose valve device shown in FIG. 1 with certain other modifications.
Figure 5:
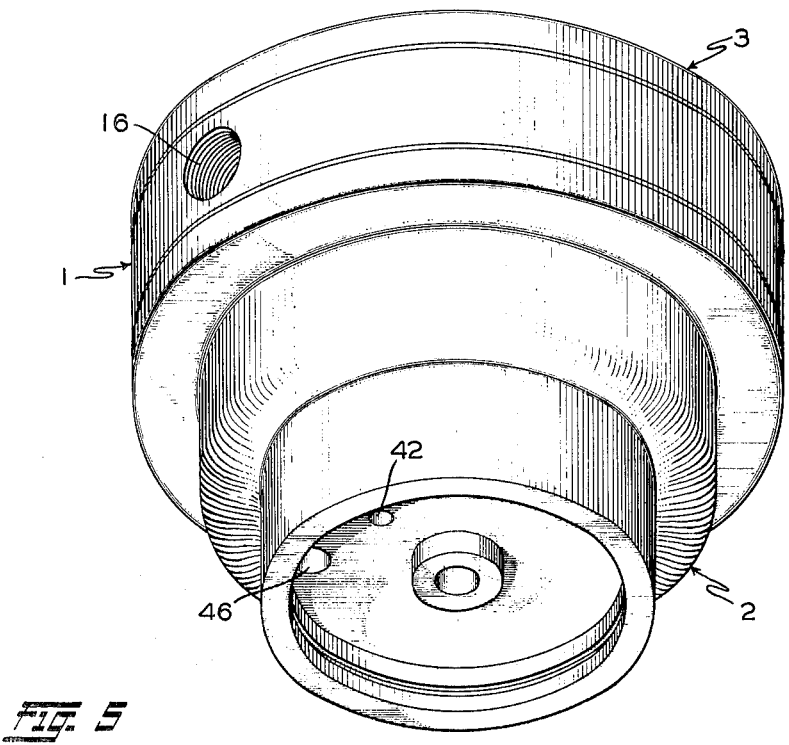
FIG. 5 is a perspective view of a portion of the multi-purpose valve device shown in FIG. 1 partly rotated about its axis.
Figure 6:
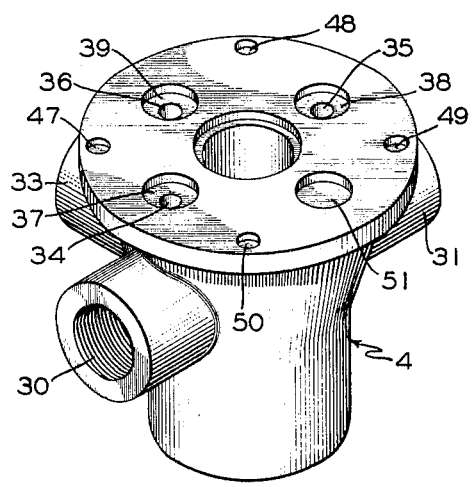
FIG. 6 is a perspective view of another portion of the multi-purpose valve device shown in FIG. 1 partly rotated about its axis.

A further modification of the multi-purpose valve device is shown in FIG. 4 of the drawings. This modification consists of the removal of the lower diaphragm 7 and the replacement thereof by a spring 69 of preselected compression value, said spring being disposed with one end bearing against separating wall 11 and the other end against the piston follower 8. With the removal of diaphragm 7 the chambers 13 and 14 are combined into a larger single chamber 70 to which passageway 42 opens.

The spring 69 acts to provide a constant upwardly directed biasing effect against diaphragm 6 to thereby either provide a constant mechanical pressure in chamber 70 opposing and pilot pressure in chamber 12 or to supplement any fluid pressure acting in chamber 70.

From the above description of the multi-purpose valve device embodying the invention, it should be evident that said valve device is characterized by great versatility of function and, therefore, greatly reduces the number of repair parts which must be kept on hand for one single valve device capable of being used for a multiplicity of purposes.

Having now described the invention, what I claim as new and desire to secure by Letters Patent, is:

1. A multi-purpose valve device comprising, in combination:
   (a) a first body portion having an upper control chamber and a lower control chamber into and out of which chambers pressurized fluid may be introduced and withdrawn, respectively,
   (b) piston means disposed in said first body portion and operable responsively to fluid pressure differential between the respective prevailing pressures in said upper and lower control chambers,
   (c) a second body portion coaxially supported on said first body portion and being selectively angularly displaceable relative thereto to a plurality of positions,
   (d) said second body portion having formed therein a plurality of chambers into and out of which pressurized fluid may be introduced or withdrawn, respectively, independently of each other,
      (i) each of said chambers in said second body portion also having associated therewith a respective passageway via which each chamber may be placed, selectively, and one at a time, in communication with said lower control chamber in said first body portion according to the angular position of said second body portion relative to said first body portion,
      (ii) whereby to influence the pressure of fluid in said lower control chamber according to that in the chamber connected thereto, and
   (e) valve means operable by said piston means, in one position, to place two of said chambers in said second body portion in communication with each other and, in a different position, to cut off such communication and open one of said two chambers to atmosphere.

2. A multi-purpose valve device comprising:
   (a) a first body portion,
   (b) a second body portion coaxially secured to said first body portion for rotation manually relative thereto to any one of a plurality of selected positions in angularly spaced relation to one another,
   (c) said first body portion having a plurality of diaphragm pistons fixed therein in spaced relation to a central valve operating stem so as to form an upper control chamber, a lower control chamber and an intermediate chamber,
   (d) said second body portion having therein a plurality of separate chambers and respective port means via which fluid under pressure may be supplied to or released from said chambers, and
   (e) valve means actuated by said valve operating stem to effect, selectively, communication between a first and a second of said chambers, or between said second and a third chamber or to cut off communication between any one of said chambers and the others,
   (f) said first and said second body portions having mating abutting surfaces at which,
      (i) in one of said angularly spaced portions, passageways in said first and second body portions are in registry to communicate fluid pressure from the first of said chambers in the second body portion to the lower control chamber, and
      (ii) in another of which angularly spaced positions other passageways are in registry to connect the second of said chambers in said second body portions to the lower central chamber.

3. A multi-purpose valve device comprising, in combination:
   (a) a casing consisting of
      (i) a first body portion having an upper control chamber and a lower control chamber, said upper control chamber having means via which fluid at a controlled pressure may be introduced thereinto and withdrawn therefrom, and
      (ii) a second body portion coaxially carried by said first body portion and being selectively angularly displaceable relative thereto to a plurality of operational positions,
      (iii) said second body portion having formed therein a plurality of fluid pressure chambers each having means whereby pressurized fluid may be supplied thereto or withdrawn therefrom and
      (iv) each having one end of respective passageways, formed in said second body portion, opening thereto, the other ends of said passageways being so disposed as to be selectively positionable, one at a time, into registry with one end of a connecting passageway formed in said first body portion, upon angular displacement of said second body portion to one of its operational positions, the other end of said connecting passageway opening to said lower control chamber,
   (b) valve means operably disposed in said casing, said valve means being operable to one position, in which communication between two of said pressure chambers, one acting as a pressurized fluid supply chamber and the other as a delivery chamber, is open, and to a different position in which said communication between the supply and delivery chambers is closed, with the latter chamber being vented to atmosphere via a second connecting passageway between said delivery chamber and a third chamber formed in said first body portion, and
   (c) piston means for operating said valve means, said piston means being subjected on opposite sides to fluid pressure prevailing in said upper and lower control chambers, respectively, and being operable responsively to dominating fluid pressure in said lower control chamber to a cut-off position for effecting operation of said valve means to its said different position and to dominating pressure in said upper control chamber to a supply position for effecting operation of said valve means to its said one position.

4. A multi-purpose valve device, as defined in claim 3, further characterized in that said piston means comprises a pair of diaphragm pistons axially spaced on a common piston stem connected to said valve means for effecting operation of the valve means, each of said pistons being subjected, on the respective sides adjacent said upper and lower control chambers and in opposing relation, to the respective fluid pressures prevailing in said upper and lower control chambers, and an intermediate control chamber disposed in said first body portion between said two diaphragm pistons and having a port opening thereinto via which pressurized fluid may be introduced thereinto or withdrawn therefrom to act on the facing sides of said diaphragm pistons adjacent said intermediate control chamber and thereby provide a biasing force on said piston means in accordance with the relationship of the respective effective pressure areas of the two diaphragm pistons.

5. A multi-purpose valve device, as defined in claim 3, further characterized in that said second body portion is effective in one of its said operational positions for isolating said connecting passageway, and therefore said lower control chamber, from said fluid pressure chambers, and being further characterized by manually operable valve means operable from a seated position to an unseated position for placing said lower control chamber in communication with said third chamber, whereby, upon preponderance of fluid pressure in said upper control chamber, operation of said valve means is effected to its said one position in which communication is open between said two of said pressure chambers, and, upon preponderance of fluid pressure in said lower control chamber, as effected past said manually operable valve means when pressurized fluid is supplied to said third chamber, operation of said valve means is effected to its said different position in which said communication between said two chambers is cut off and said third chamber is placed in communication with one of said two chambers via said second connecting passageway.

6. A multi-purpose valve device comprising, in combination:
  (a) a first body portion having an upper control chamber, into and out of which fluid at a controlled pressure may be introduced and withdrawn, respectively, and a lower control chamber,
  (b) a second body portion coaxially supported on said first body portion and being selectively angularly displaceable relative thereto to a plurality of operational positions,
  (c) said second body portion having formed therein a first chamber and a second chamber, one acting as a supply chamber and the other as a delivery chamber and between which communication may be opened or cut off, and a third chamber isolated from said first and second chambers,
    (i) each of said first, second and third chambers having means via which pressurized fluid may be supplied thereto or withdrawn therefrom independently of each other,
    (ii) and each of said first, second and third chambers having one end of respective first, second and third passageways formed in said second body portion, opening thereto, the respective other ends of said first, second and third passageways opening in said second body portion adjacent an abutting face of said first body portion so as to be selectively positionable, one at a time depending upon the selected operational position of said second body portion, with one end of a connecting passageway formed in said first body portion and having one end opening to said abutting face and the other end of said lower control chamber,
  (d) valve means having one position in which said communication between said first and second chambers is opened, and being operable to a different position, in which said communication is cut off and the delivery chamber is vented to atmosphere via a communicating passageway between said delivery chamber and atmosphere,
  (e) diaphragm piston means subjected on opposite sides to the fluid pressures prevailing in said upper and lower control chambers, respectively, for controlling operation of said valve means,
  (f) said piston means being operable responsively to dominating pressure in said upper control chamber to a supply position, in which said valve means is caused to move to its said one position, and being operable responsively to dominating pressure in said lower control chamber to a cut-off position in which said valve means is caused to move to its said different position, and
  (g) the pressure of fluid in said lower control chamber being determined by the pressure of fluid prevailing in the respective chamber of said first, second and third chambers communicating with said lower control chamber via the respective passageway of said first, second and third passageways and said connecting passageway as determined by the selected position of said second body portion.

References Cited by the Examiner
UNITED STATES PATENTS

| 648,593 | 5/1900 | Metzger | 92—6 |
| 2,940,798 | 6/1960 | Weber | 137—270 X |
| 3,181,432 | 5/1965 | Puster | 92—6 |

ISADOR WEIL, *Primary Examiner.*
ALAN COHAN, *Examiner.*